(12) United States Patent
Lin et al.

(10) Patent No.: US 8,164,981 B2
(45) Date of Patent: Apr. 24, 2012

(54) ULTRASONIC DISTANCE-MEASURING SENSOR WITH GAP AND PARTITION BETWEEN VIBRATING SURFACES

(75) Inventors: Chia-Yu Lin, Taipei (TW);
Chih-Chiang Cheng, Taipei (TW);
Chih-Kung Lee, Taipei (TW);
Wen-Jong Wu, Taipei (TW);
Chuin-Shan Chen, Taipei (TW);
Pei-Zen Chang, Taipei (TW)

(73) Assignee: National Taiwan University, Taipei (TW)

( * ) Notice: Subject to any disclaimer, the term of this patent is extended or adjusted under 35 U.S.C. 154(b) by 324 days.

(21) Appl. No.: 12/494,193

(22) Filed: Jun. 29, 2009

(65) Prior Publication Data
US 2010/0002542 A1    Jan. 7, 2010

(30) Foreign Application Priority Data

Jul. 1, 2008 (TW) .............................. 97124683 A

(51) Int. Cl.
*G01S 15/00* (2006.01)
*G01S 3/80* (2006.01)

(52) U.S. Cl. .......................................... 367/99; 367/118

(58) Field of Classification Search .................... 367/99, 367/118
See application file for complete search history.

(56) References Cited

U.S. PATENT DOCUMENTS

| 4,788,968 | A  | * | 12/1988 | Rudashevsky et al. | 601/78 |
|-----------|----|---|---------|--------------------|--------|
| 4,961,345 | A  | * | 10/1990 | Tsuruoka et al.    | 73/32 A |
| 6,069,514 | A  | * | 5/2000  | Fairbanks          | 327/292 |
| 6,678,213 | B1 | * | 1/2004  | Rask et al.        | 367/163 |
| 2002/0074426 | A1 | * | 6/2002 | Tanaka et al.     | 239/102.1 |
| 2004/0173541 | A1 | * | 9/2004 | Kurihara et al.   | 210/748 |
| 2006/0072770 | A1 | * | 4/2006 | Miyazaki          | 381/116 |
| 2006/0230835 | A1 | * | 10/2006 | Wang             | 73/718 |
| 2007/0159507 | A1 | * | 7/2007  | Urano             | 347/20 |
| 2007/0261493 | A1 | * | 11/2007 | Kim               | 73/594 |

* cited by examiner

*Primary Examiner* — Thomas Tarcza
*Assistant Examiner* — James Hulka

(57) ABSTRACT

An ultrasonic distance-measuring sensor assembly and an ultrasonic distance-measuring sensor thereof are disclosed. The ultrasonic distance-measuring sensor includes at least two piezoelectric actuators and a member. The member includes a side wall, at least two vibration generating/receiving surfaces and a partition. The vibration generating/receiving surfaces accommodate the piezoelectric actuators as sources. The side wall surrounds the vibration generating/receiving surfaces. The partition is disposed between the vibration generating/receiving surfaces and includes a slot. The slot is disposed between the vibration sending/receiving surfaces.

10 Claims, 6 Drawing Sheets

ULTRASONIC DISTANCE-MEASURING SENSOR WITH GAP AND PARTITION BETWEEN VIBRATING SURFACES

CROSS REFERENCE TO RELATED APPLICATIONS

This Application claims priority of Taiwan Patent Application No. 97124683, filed on Jul. 1, 2008, the entirety of which is incorporated by reference herein.

BACKGROUND OF THE INVENTION

1. Field of the Invention

The present invention relates to an ultrasonic distance-measuring sensor assembly and an ultrasonic distance-measuring sensor thereof, and in particular relates to an ultrasonic distance-measuring sensor assembly and an ultrasonic distance-measuring sensor thereof with a plurality of independent ultrasonic generating/receiving unit.

2. Description of the Related Art

Conventionally, an ultrasonic distance measuring sensor system is composed of two transducer units. One is an ultrasound generated unit and the other is an ultrasound received unit. These units are included an aluminum member whose inner surface was stuck by a piezoelectric plate as an actuator or a sensor. Thus, if the conventional ultrasonic distance-measuring sensor is applied to measure distance, for example car reversal radar, at least two ultrasonic transders are simultaneously used. Normally, one ultrasonic emitter generates an ultrasonic signal, and the other ultrasonic sensor receives the ultrasonic signal for measuring distance.

When considering application and cost, most ultrasonic distance-measuring sensors use a single unit to generate and then receive reflected ultrasonic signals from the barrier. A switch is added into the ultrasonic distance-measuring sensor to switch between a generating and a receiving current route, thus controlling the piezoelectric plate to generate or to receive the ultrasonic signal. After the ultrasonic distance-measuring sensor generates several ultrasonic waves with a period, the switch is switched to a receiving mode, and then a vibrating/sensing surface stops vibrating. However, after the reverberation time, the vibration is completely stopped, and then a vibrating/sensing surface starts to receive the ultrasonic waves reflected by a barrier. The detected distance due to the reverberation time and the velocity of the ultrasonic wave is defined as a dead zone of the ultrasonic distance-measuring sensor. That is, when the distance between the ultrasonic distance-measuring sensor and an object is less than the distance transformed according to the reverberation time and the velocity of the ultrasonic wave, the reflected signal is mixed with the reverberation signal. Thus, the object can not be discriminated. Specifically, the conventional ultrasonic distance-measuring sensor operates with the dead zone.

Meanwhile, when applied to the automobile industry, the ultrasonic distance-measuring sensor detects a wide horizontal area and narrow vertical area. The ultrasonic wave reflected by a distant barrier is not distinguished from the wave reflected by the ground in the time domain. Thus, the ultrasonic distance-measuring sensor is designed to generate an anisotropic beam.

BRIEF SUMMARY OF THE INVENTION

The present invention provides an ultrasonic distance-measuring sensor assembly and an ultrasonic distance-measuring sensor thereof.

The ultrasonic distance-measuring sensor of the present invention comprises at least two piezoelectric plates for forming an independent ultrasonic generating/receiving source, and a member. The member includes a side wall, at least two vibration generating/receiving surfaces and a partition. The vibration generating/receiving surfaces accommodate the piezoelectric plates. The side wall surrounds the vibration generating/receiving surfaces. The partition is disposed between the vibration generating/receiving surfaces and comprises a slot. The slot is disposed between the vibration generating/receiving surfaces.

Note that the shape of the member is circular.

Note that when the diameter of the member is 23 mm, the slot is less than 3 mm.

Note that the ultrasonic distance-measuring sensor further comprises a shell. The shell packages the piezoelectric actuators and the member.

The ultrasonic distance-measuring sensor assembly comprises the ultrasonic distance-measuring sensor, a signal processor, at least a signal source, and two amplifiers. The amplifiers are respectively electrically connected to the signal source, the signal processor and the piezoelectric actuators.

Note that the ultrasonic distance-measuring sensor assembly further comprises a delay and a reference signal source. The delay is electrically connected to the reference signal source.

Note that the ultrasonic distance-measuring sensor assembly further comprises a switch electrically connected to the piezoelectric plates.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
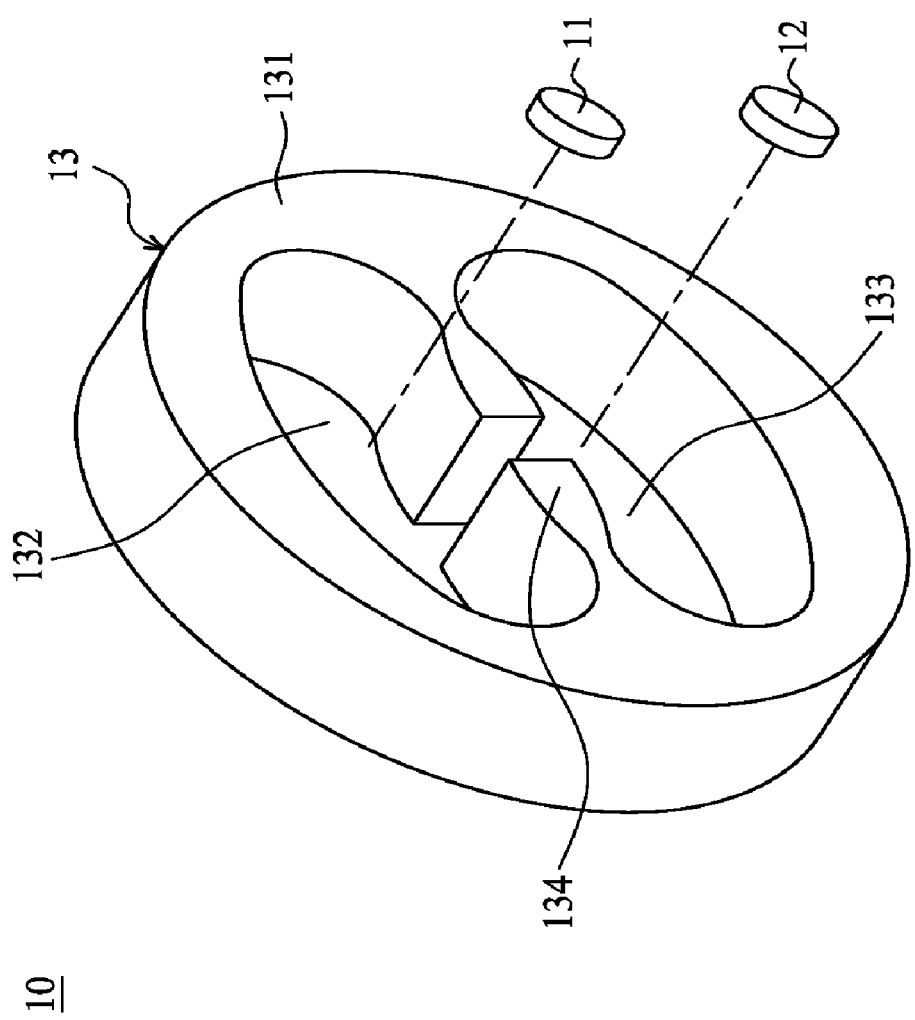
FIG. 1 is an exploded view of a member and two piezoelectric actuators of an ultrasonic distance-measuring sensor of the present invention.
Figure 2:
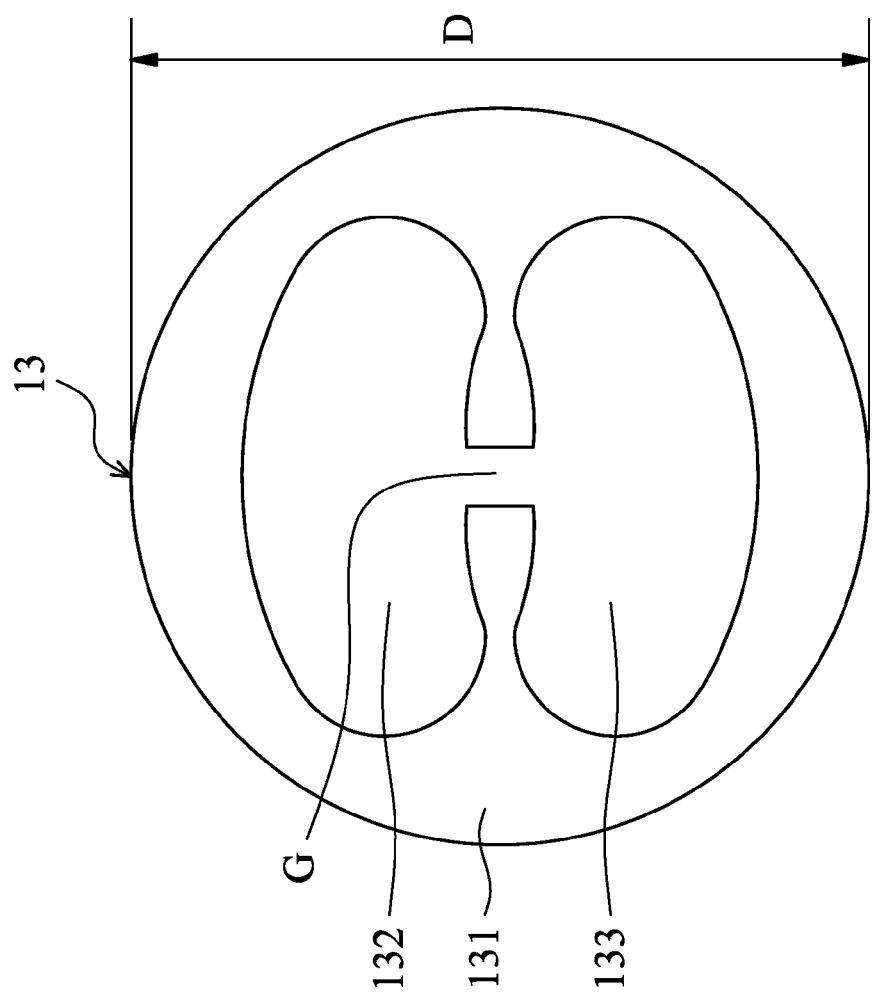
FIG. 2 is a vertical view of a member of an ultrasonic distance-measuring sensor of the present invention.
Figure 3:
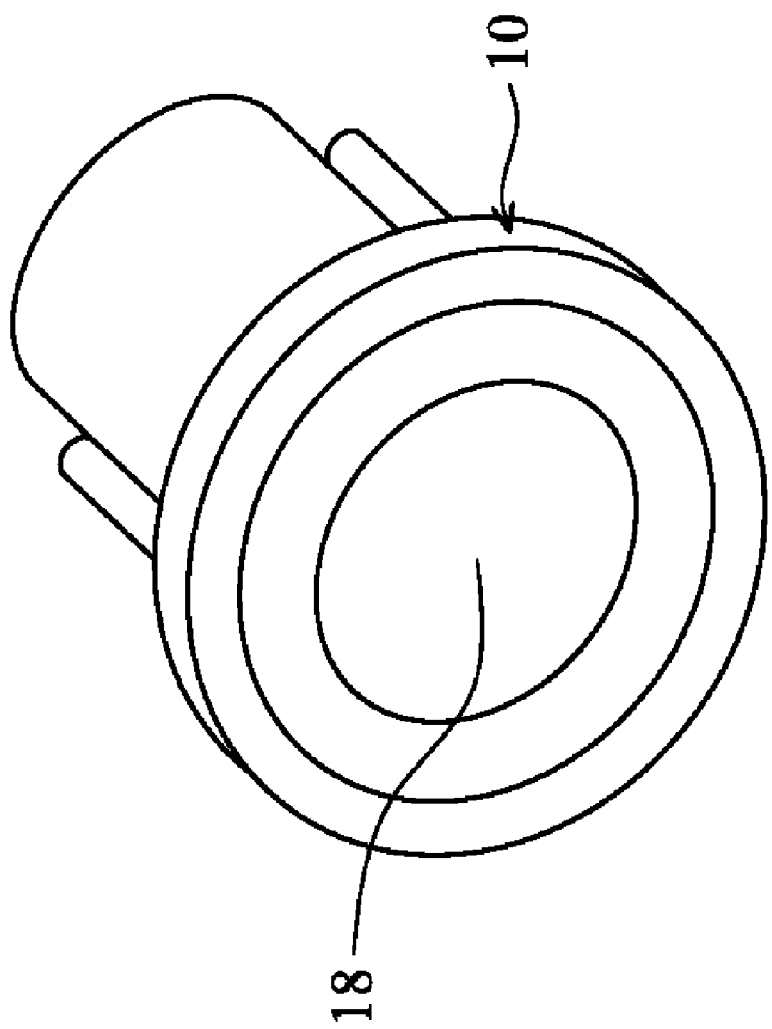
FIG. 3 is a schematic view of an ultrasonic distance-measuring sensor of the present invention.

FIG. 1 is an exploded view of a member and two piezoelectric actuators of an ultrasonic distance-measuring sensor of the present invention. FIG. 2 is a vertical view of a member of an ultrasonic distance-measuring sensor of the present invention. FIG. 3 is a schematic view of an ultrasonic distance-measuring sensor of the present invention.

Referring to FIGS. 1 to 3, an ultrasonic distance-measuring sensor 10 comprises two piezoelectric actuators 11 and 12, a member 13 and a shell 18. The member 13 comprises a side wall 131, two vibration sending/receiving surfaces 132 and 133, and a partition 134. The vibration sending/receiving surfaces 132 and 133 accommodate the piezoelectric actuators 11 and 12. The partition 134 is disposed between the vibration sending/receiving surfaces 132 and 133, and comprises a slot G disposed between the vibration sending/receiving surfaces 132 and 133. In this embodiment, the slot G is disposed in the center of the partition 134. The shell 18 packages the piezoelectric transducers 11 and 12 and the member 13.

Note that the present invention utilizes the partition 134 to separate the piezoelectric transducers 11 and 12. When the piezoelectric plates 11 and 12 generate or receive an ultrasonic signal, the vibration is generated, interfering with each other via the partition 134. Thus, the slot G is disposed in the center of the partition 134 for eliminating vibrations, ensuring that the piezoelectric transducers 11 and 12 are detached and are not interfering with each other.

In this embodiment, note that the member 13 is circular and the diameter of the member 13 is 23 mm. The slot G is less than 3 mm.

Figure 4:
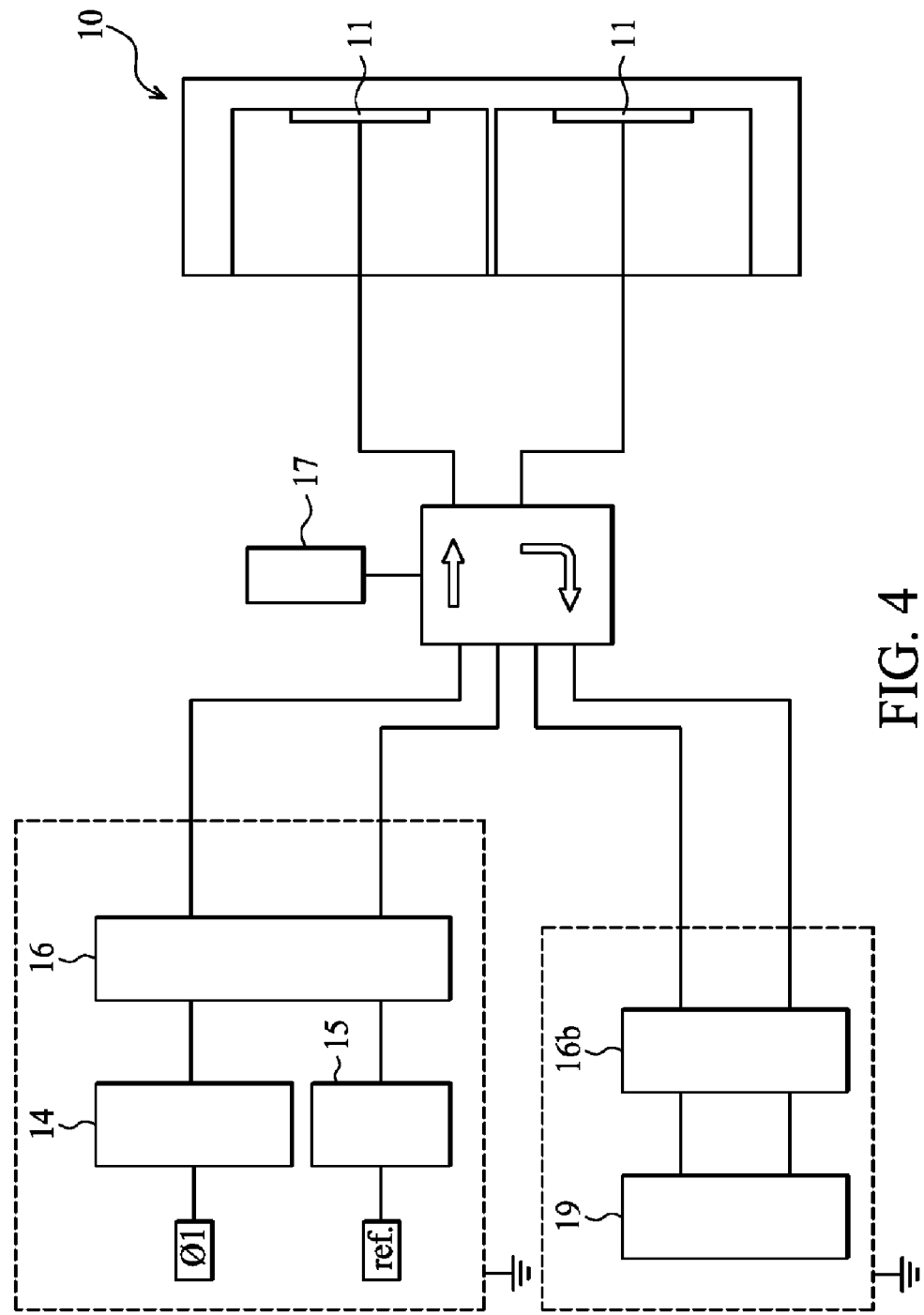
FIG. 4 is a schematic view showing an ultrasonic distance-measuring sensor assembly in a long-distance mode.

FIG. 4 is a schematic view showing an ultrasonic distance-measuring sensor assembly in a long-distance mode. Referring to FIG. 4, an ultrasonic distance-measuring sensor assembly comprises an ultrasonic distance-measuring sensor 10, a signal sources $\psi 1$ with phase difference, a reference signal source ref., an amplifier 16 and a switch 17. The reference signal source ref. is electrically connected to the ground 15. The amplifier 16 is electrically connected to the signal $\psi 1$, the ground 15 and the piezoelectric transducers 11 and 12. The switch 17 is provided for controlling software to switch between the long-distance mode and the short-distance mode (shown in FIG. 6).

The signal source $\psi 1$ with phase difference send signals to the amplifier 16. Because the signal sent by the reference signal source ref. and the signal sent by the signal sources $\psi 1$ have phase differences, the signals with various phase pass through the amplifier 16 and enter the piezoelectric transducer 11 for generating various ultrasonic beam pattern. The piezoelectric transducers 11 and 12 generate several periodic waves and then stop. When the ultrasonic waves interfere with each other in air and transmit to an object, reflected waves are generated and transmitted back the piezoelectric transducers 11 and 12. The reflected waves pass through the amplifier 16b and then are transmitted to a signal processor 19 for signal processing. Thus, the ultrasonic distance-measuring sensor assembly can detect angles and measure the distance of objects.

Figure 5:
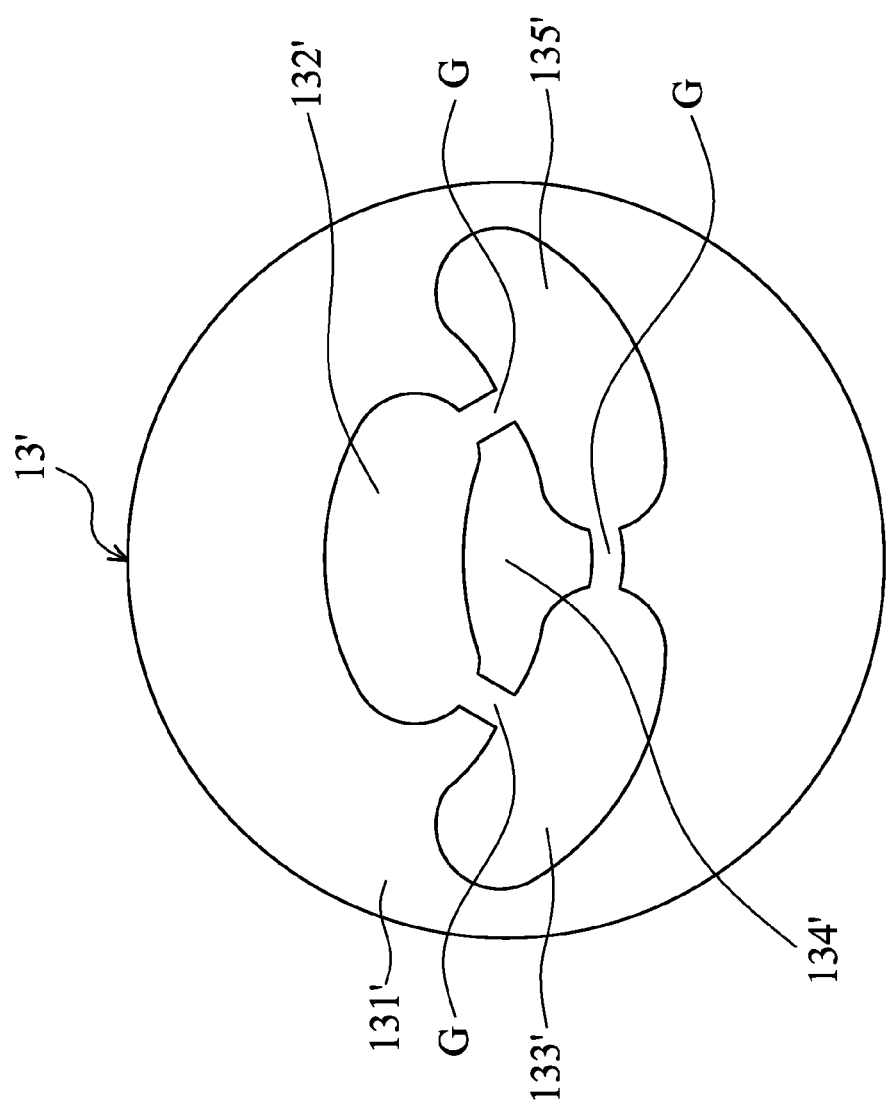
FIG. 5 is a vertical view of another embodiment of a member of an ultrasonic distance-measuring sensor of the present invention.

FIG. 5 is a vertical view of another embodiment of a member of an ultrasonic distance-measuring sensor of the present invention. Referring to FIG. 5, the member 13' comprises a side wall 131', three vibration generating/receiving surfaces 132', 133' and 135', and a partition 134'. The vibration generating/receiving surfaces 132', 133' and 135' accommodate three piezoelectric transducers (not shown). The partition 134' is disposed between the vibration sending/receiving surfaces 132', 133' and 135', and comprises a slot G disposed between the vibration sending/receiving surfaces 132', 133' and 135'. In this embodiment, the partition 134' is surrounded by the slot G and the vibration sending/receiving surfaces 132', 133' and 135'. Note that the member 13' is circular and the diameter of the member 13' is 23 mm. The slot G is less than 3 mm.

Figure 6:
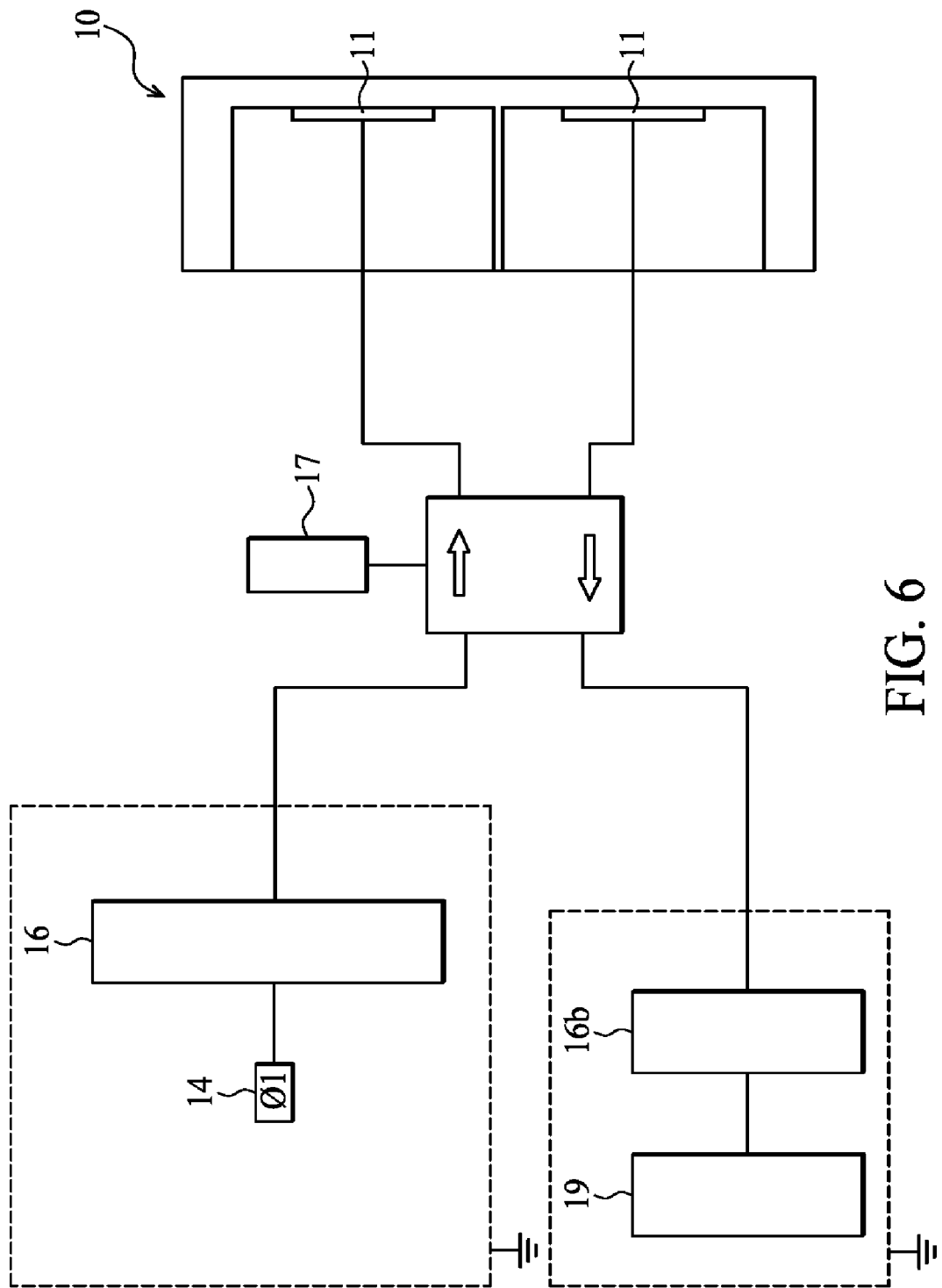
FIG. 6 is a schematic view showing an ultrasonic distance-measuring sensor assembly in a short-distance mode.

FIG. 6 is a schematic view showing an ultrasonic distance-measuring sensor assembly in a short-distance mode. The difference is that the signal source $\psi 1$ sends a signal to the amplifier 16 and the piezoelectric transducer 11 for sending ultrasonic waves. When the ultrasonic waves are transmitted to an object, reflected waves are generated and transmitted back the piezoelectric transducer 12. The reflected waves pass through the amplifier 16b and then are transmitted to a signal processor 19 for signal processing. In the short-distance mode, the piezoelectric transducer 11 generates several periodic waves and then stops. After the reverberation time, the vibration is completely stopped. The piezoelectric transducer 12 receives the ultrasonic waves reflected by the barrier because the member 13 of the present invention ensures that the piezoelectric transducers 11 and 12 are independent and are not interfering with each other. Thus, the problem of the reflected signal mixing with the reverberation signal is prevented, and the ultrasonic distance-measuring sensor assembly does not operate with a dead zone.

In summary, the ultrasonic distance-measuring sensor assembly and the ultrasonic distance-measuring sensor provide at least two piezoelectric transducers 11 and 12 disposed in a single member 13. The vibration generating/receiving surfaces 132 and 133 driven by the piezoelectric transducers 11 and 12 are independent and do not interfere with each other via the partition 134 of the member 13 and the slot G. The adder 14, the delay 15 and the amplifier 16 are electrically connected to the ultrasonic distance-measuring sensor 10 for generating various ultrasonic waves, and measuring an object at various angles. The vibration generating/receiving surfaces 132 and 133 are independent and do not interfere with each other, thus, when the ultrasonic distance-measuring sensor 10 is close to an object, the switch 17 switches one piezoelectric transducer as a generating source and the other piezoelectric transducer as a receiving source. Because the vibration generating/receiving surfaces 132 and 133 are independent and do not interfere with each other, the reflected signal does not mix with the reverberation signal.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An ultrasonic distance-measuring sensor, comprising:
   at least two piezoelectric transducers; and
   a member comprising:
     a side wall;
     at least two vibration sending/receiving surfaces sending and receiving an ultrasonic wave, the vibration generating/receiving surfaces accommodating the piezoelectric transducers, and the side wall surrounding the vibration generating/receiving surfaces; and
     a partition disposed between the vibration generating/receiving surfaces and comprising a slot disposed between the vibration sending/receiving surfaces.

2. The ultrasonic distance-measuring sensor as claimed in claim 1, wherein the shape of the member is circular.

3. The ultrasonic distance-measuring sensor as claimed in claim 2, wherein when the diameter of the member is 23 mm, the slot is less than 3 mm.

4. The ultrasonic distance-measuring sensor as claimed in claim 1, further comprising a shell, wherein the shell packages the piezoelectric transducers and the member.

5. An ultrasonic distance-measuring sensor assembly, comprising:
- at least two piezoelectric transducers;
- a member comprising:
  - a side wall;
  - at least two vibration sending/receiving surfaces sending and receiving an ultrasonic wave, the vibration generating/receiving surfaces accommodating the piezoelectric transducers, and the side wall surrounding the vibration generating/receiving surfaces; and
  - a partition disposed between the vibration generating/receiving surfaces and comprising a slot disposed between the vibration generating/receiving surfaces;
- a signal processor;
- at least a signal source; and
- two amplifiers respectively electrically connected to the signal source, the signal processor and the piezoelectric transducers.

6. The ultrasonic distance-measuring sensor assembly as claimed in claim 5, further comprising a delay and a reference signal source, wherein the delay is electrically connected to the reference signal source.

7. The ultrasonic distance-measuring sensor assembly as claimed in claim 5, wherein the shape of the member is circular.

8. The ultrasonic distance-measuring sensor assembly as claimed in claim 5, wherein when the diameter of the member is 23 mm, the slot is less than 3 mm.

9. The ultrasonic distance-measuring sensor assembly as claimed in claim 5, further comprising a shell, wherein the shell packages the piezoelectric transducers and the member.

10. The ultrasonic distance-measuring sensor assembly as claimed in claim 5, further comprising a switch electrically connected to the piezoelectric transducers.

* * * * *